United States Patent [19]
Kurmlavage

[11] Patent Number: 6,101,927
[45] Date of Patent: Aug. 15, 2000

[54] ROLLER GRILL MONITORING DEVICE

[75] Inventor: Michael M. Kurmlavage, Lansdowne, Pa.

[73] Assignee: Spirit Specialty Solutions, Inc., Lansdowne, Pa.

[21] Appl. No.: 09/280,815
[22] Filed: Mar. 30, 1999
[51] Int. Cl.[7] .................................................. A23L 1/00
[52] U.S. Cl. ............................................. 99/343; 99/342
[58] Field of Search ........................... 99/342, 343, 393, 99/395

[56] References Cited

U.S. PATENT DOCUMENTS 1,272,318  7/1918  Rodgers .................................. 99/343
2,344,853  3/1944  Haes ..................................... 99/342 X
4,633,772  1/1987  Bowden et al. ....................... 99/344 X Primary Examiner—Reginald L. Alexander
Attorney, Agent, or Firm—Smith Patent Office

[57] ABSTRACT

A roller grill monitoring device having a clock face, a base which fits in between rollers of a grill roller, a stem for attaching the clock face to the base and a support structure attached to the stem disposed at a distance above the base so as to rest on the grill rollers. The device is inexpensive to make, is sanitary and made of a heat resistant material. The device can further include a signage area for identifying and marketing different types of food products such as hot dogs. It can be easily moved around the grill and takes up very little space so as not to take up cooking area.

15 Claims, 8 Drawing Sheets

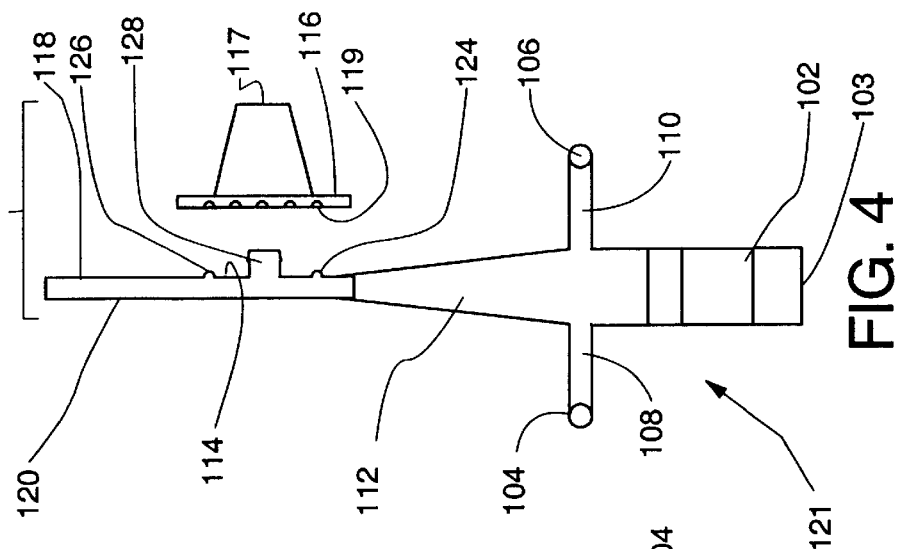
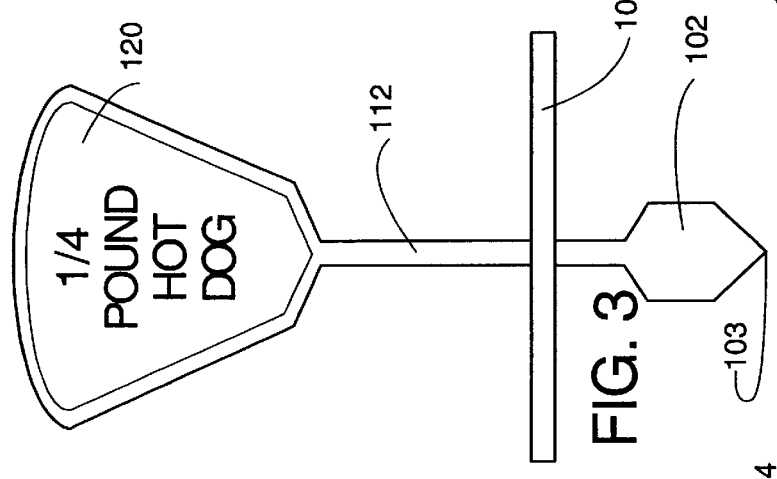
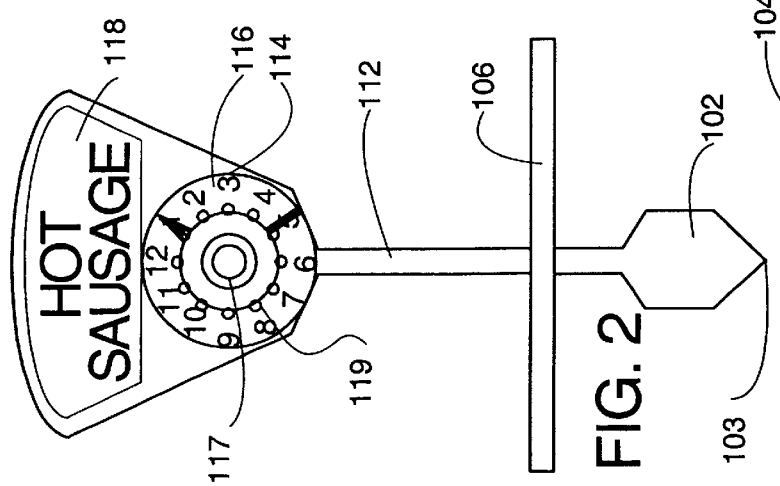
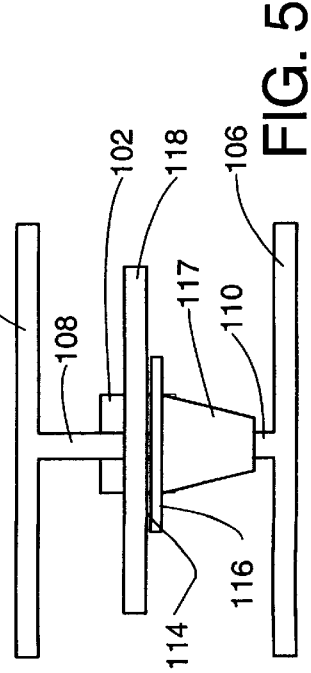

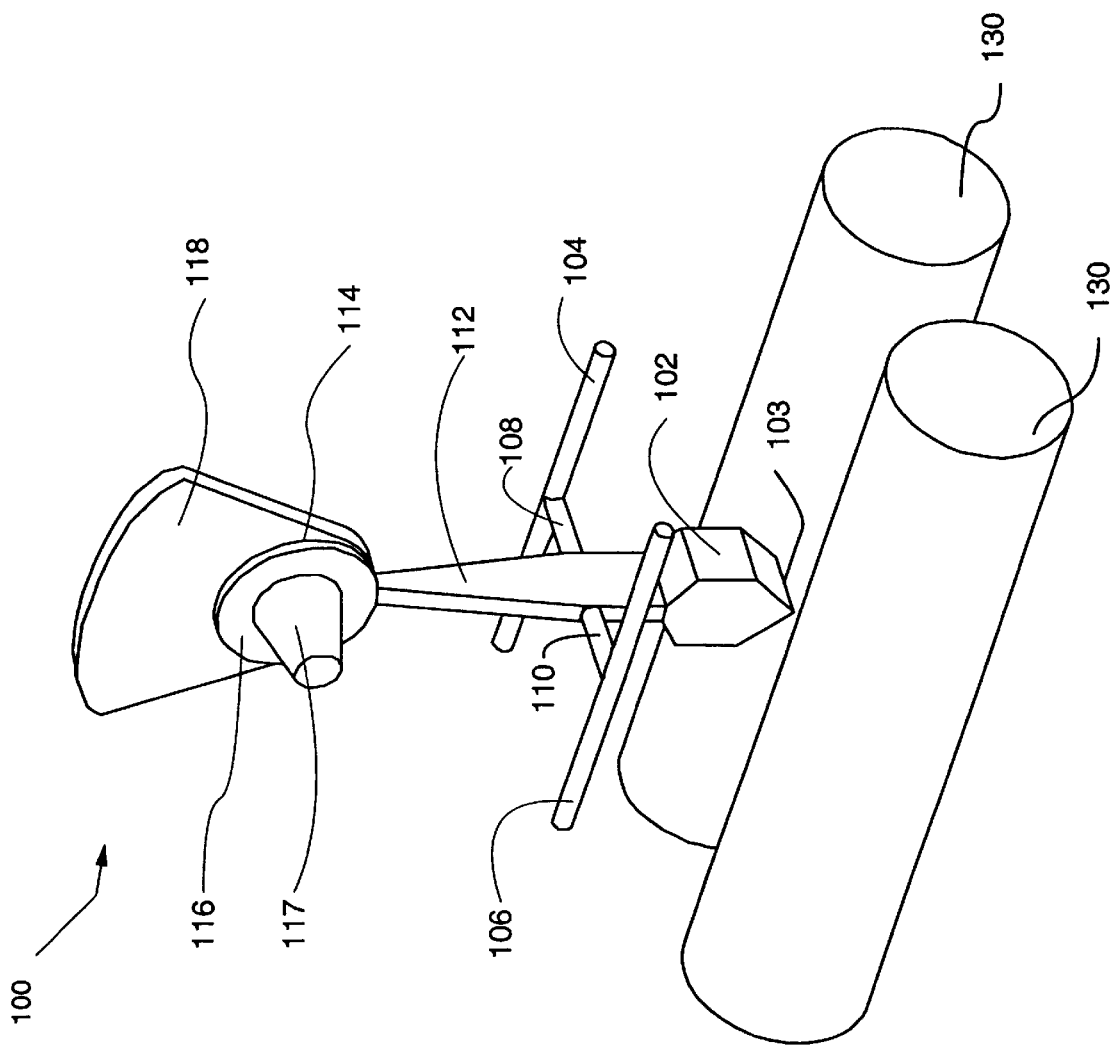

ROLLER GRILL MONITORING DEVICE

BACKGROUND OF THE INVENTION

1. Field of the Invention

This invention relates to a roller grill monitoring device that assists convenience store operators in keeping track of elapsed cooking time. More particularly, this invention relates to a roller grill monitoring device that can record the time when hot dogs, sausages or other roller grill food is placed on the grill without detracting from the cleanliness or appearance of the food. At the same time, the invention indicates to the consumer the type of food that is on the grill to enhance in marketing the food.

2. Discussion of the Related Art

In this era of fast food, individuals are increasingly dependent on quick service restaurants and convenience stores for a quick meal. Beginning in the 1960's and increasing in popularity ever since, the roller grill became an efficient way to cook and store hot dogs to be made readily available to consumers without being labor intensive. With the advent of roller grills, hot dogs could be prepared without the necessity of the store clerk flipping or rolling the grilled food by hand throughout the day. The development of the gas station/convenience store made this type of food even more widely available and popular.

With more opportunities to sell more hot dogs in these numerous establishments, the industry began offering additional hot dog types such as sausage, a ¼ pound hot dog, spicy, mild, kielbasa, alternative meat hot dogs such as turkey, beef or soy, and others. All of these foods were still best prepared using the roller grill. Indeed, presently roller grills are still the leading hot dog cooker of choice for national convenience store chains, vending operations and cafeterias. These roller grills can be used on the front serving counter where customers serve themselves or on a back counter where a store employee takes an order from a customer and assembles and serves the food product such as a hot dog.

As noted above, the advantage of the roller grill is that the store operator does not need to continually monitor and roll the hot dogs which frees the employee up for additional tasks. However, a problem arises in that the hot dogs can easily get ignored as the store clerk loses track of the time that each hot dog was originally placed on the grill. This problem becomes even worse with the practice of staggering hot dog placement on the grill. The employee must attempt to remember the time and flavor of each hot dog on the roller grill, and these grills are capable of cooking and holding a very large number of hot dogs. A poorly cooked hot dog can hurt or destroy a consumer's confidence in a particular eating establishment. Moreover, a hot dog which is undercooked or overcooked presents a serious health concern for the consumer, and the U.S. Department of Health has taken a strong interest in this issue.

Recent health and liability concerns have made it important to cook all foods to a predetermined temperature at a predetermined rate. This requirement by the U.S. Department of Health makes it critical that the operator keep track of how long each and every hot dog has been on the roller grill. In addition, with the many different flavors of hot dogs noted above, it is also important that the operator be able to identify the flavor of each and every hot dog on the grill.

There are products on the market for convenience stores and the like to merchandise the various hot dog flavors. These products are made of metal or plastic wire with either a plastic or metal sign area having two legs that extend through the rollers and a further perpendicular leg that passes between different rollers to support the sign. The problem with this type of grill sign is that they are not sanitary. Further, the signs take up too much space on the grill which could be used for cooking. In addition, the metal signs are hot to the touch, and therefore they cannot be moved easily and create a burning hazard to the operator. Not one of the existing devices helps the operator keep track of cooking time or elapsed time.

Despite the critical importance of monitoring cooking time, none of the hot dog signage products adequately keeps track of elapsed cooking time. Some operators, realizing the importance of keeping track of cooking times write the startup times on a piece of masking tape and tape it to the side of the roller grill. These makeshift monitors are unsanitary and inconvenient to use and still fail to keep track of the type and startup time for each individual hot dog or batch of hot dogs on the grill.

Another method for keeping track of hot dogs on the grill is writing the startup times on a clipboard and then checking the clipboard periodically to see if the hot dogs are cooked enough or overcooked. The problem with this method is that it relies heavily on the memory of the operator, and provides no information to the consumer. Thus, the clipboard method is ineffective as a monitor for individual hot dogs, and it is ineffective as a merchandising tool.

Monitors for coffee have been used in convenience stores and cafeterias recently. These monitors clip-onto a coffee pot handle and indicate how long the coffee has been sitting on a warming plate. This is an example of how monitors can be used as a means for food quality control in a fast food environment.

However, there is presently no device that effectively monitors cooking times of each individual hot dog or batch of hot dogs. Moreover, there is no device that both monitors cooking times and identifies the type of hot dog for marketing purposes.

SUMMARY OF THE INVENTION

An object of this invention is to provide a roller grill monitoring device that keeps track of starting times for each individual hot dog or batch of hot dogs placed on the grill.

Another object of the invention is to provide a roller grill monitoring device that identifies the flavor of each hot dog on the grill and can further include additional marketing information.

A still further object of the invention is to provide a roller grill monitoring device that is designed to fit properly on a roller grill and which can be easily relocated on the grill if the hot dogs are moved to a different area of the grill.

An additional object of the invention is to provide a roller grill monitoring device that is sanitary and that is cool to the touch when in use on the roller grill.

Another object of the invention is to provide a roller grill monitoring device that assists the operator in preparing food that has a high degree of quality control expected by consumers and by the U.S. Department of Health.

Yet another object of the invention is to provide a roller grill monitoring device that is easy to manufacture, utilizes a molded, one piece, high temperature, plastic body design, using sanitary, FDA approved plastic.

A still further object of the invention is to provide a roller grill monitoring device that easily slides in between and out of the rollers, takes up very little cooking space on the grill and that is sturdy enough to avoid being knocked over.

The above and other objects and advantages are achieved with a roller grill monitoring device comprising a clock face for recording starting time, a base which fits in between the grill rollers, a stem for attaching the clock face to the base, a support structure attached to the stem disposed at a distance above the base so as to rest on the grill rollers. The device is inexpensive to make, is sanitary and can be made of a heat resistant material. The device can further include a signage area for identifying and marketing different types of hot dogs. It can be easily moved around the grill and takes up very little space so as not to take up cooking area.

Other objects, features and advantages of the invention will be apparent from the following detailed description taken in conjunction with the accompanying drawings wherein preferred embodiments of the invention have been selected for exemplification and from the individual features and relationships of the respective appended claims.

BRIEF DESCRIPTION OF THE DRAWINGS

The above and other objects and features of the present invention will be clearly understood from the following description with respect to the preferred embodiments thereof when considered in conjunction with the accompanying drawings, wherein the same reference numerals have been used to denote the same or similar parts or elements, and in which:

FIG. 2 is a front view of the roller grill monitoring device showing the clock face and signage area according to the embodiment of FIG. 1.

FIG. 3 is a rear view of the same roller grill monitoring device as shown in FIG. 1 but having a different sign on the reverse of the signage area.

FIG. 4 is a side view of the grill monitoring device according to the embodiment of FIG. 1, illustrating the dial detached from the body.

FIG. 5 is a top view of the grill monitoring device according to the embodiment of FIG. 1.

FIG. 6 is a perspective view of the grill monitoring device according to the embodiment of FIG. 1 being inserted between two rollers.

DETAILED DESCRIPTION OF THE PREFERRED EMBODIMENTS

Figure 1:
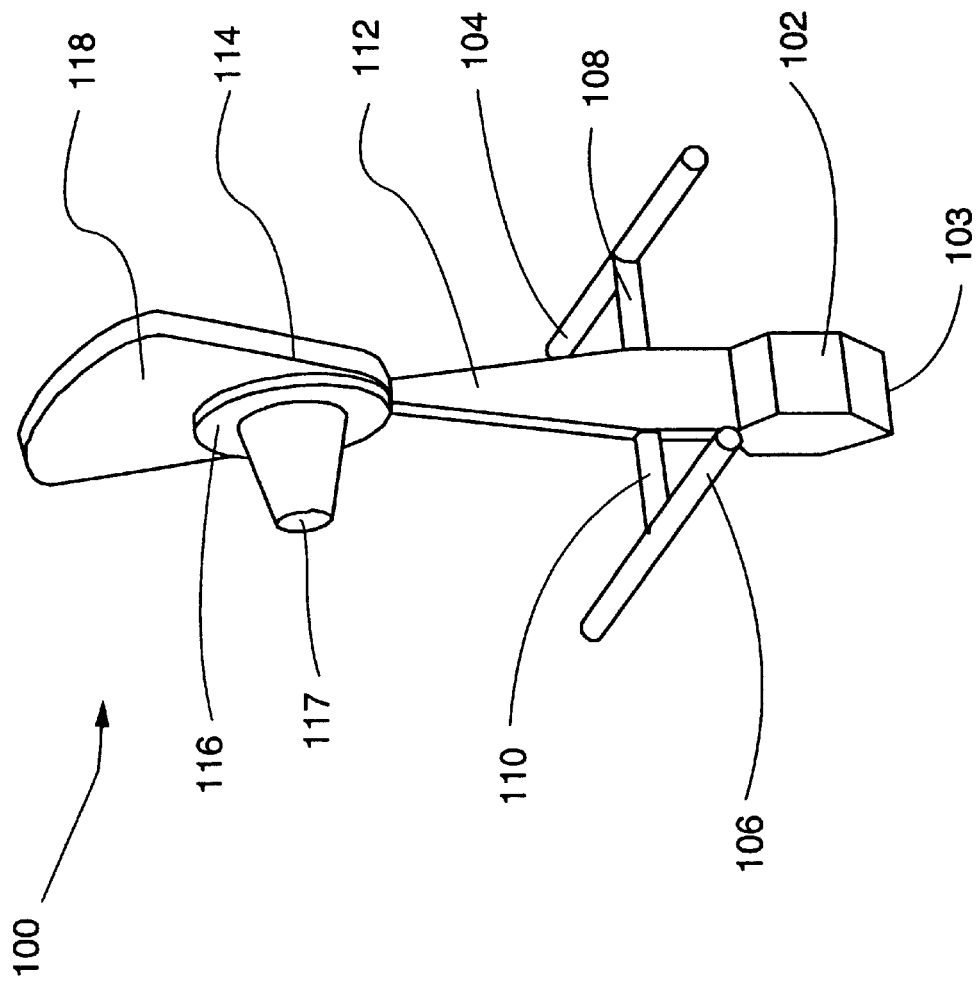
FIG. 1 is a perspective view of a grill monitoring device having a weighted or widened base according to an embodiment of the present invention.

While this specification concludes with claims defining the feature of the invention that are regarded as novel, it is believed that the invention will be better understood from a consideration of the following description in conjunction with the drawing figures, in which like reference numerals are carried forward.

FIGS. 1–8 illustrate a monitoring device 100 having a weighted or widened base 102, support bars 104, 106, 108, and 110 in the form of an "H" and vertical stem 112. A clock face area 114 functions to record the start times of the individual hot dogs or group of hot dogs. In particular, the clock face dial 116 is preferably made of heat resistant, FDA approved plastic. The dial 116 is transparent so that the numbers on the clock face area 114 are visible through the dial 116. In this particular embodiment, the dial 116 is approximately 1" in diameter and has a knob 117 with a smaller diameter such as ⅝". The knob 117 is preferably made of a non-skid surface to facilitate turning. The clock face area 114 has a clock face corresponding to the numbers on a clock. The clock face can be hot stamped into the body with ink. The dial 116 preferably snaps onto a molded-in male connecting tab 128 and further contains anti-jar nibs 124, 126 which match up to recesses 119 on the back side of the dial 116 so that the dial 116 is not easily moved from its setting. FIG. 4 illustrates how the dial 116 and knob 117 snaps onto the connecting tab 128 to cover clock face area 114.

In addition, the dial 116 has a green start arrow and a red stop indicator hot stamped into it. The dial 116 turns freely on the body with a twist of the non-skid finger knob 117. If the anti-jarring nibs 124, 126 are present, it clicks as it turns so that the dial 116 is not easily jarred from its setting. In this way the operator and consumer can rely on the information. The clicks result from the female anti-jar recesses 119 molded into the rear of the dial 116 and being inserted onto the male connecting tab 128, shown in FIG. 5, molded onto the clock face area 114. The operator sets the dial 116 to whatever time a hot dog or batch of hot dogs is started. As noted above, the dial 116 has a small green arrow shown in FIG. 2 that is hot stamped into it. The operator sets the green arrow by turning the dial 116 using the non-skid finger knob 117 until the green arrow points to the closest correct starting hour.

In this preferred embodiment, the dial also has a small red rectangle shown in FIG. 2 that is hot stamped into it. The red indicator is calibrated to show the operator when 4 hours of cooking/holding time has elapsed from the start time. The elapsed time calibration can be made to fit the quality control needs of the particular operation or to adhere to particular U.S. Health Department standards. In this example, 4 hours is indicated on the dial, but this time could be any desired time. Once the time of day corresponds to the "red area," the operator knows to discard the hot dog, thereby maintaining a much higher caliber of quality control.

Figure 8:
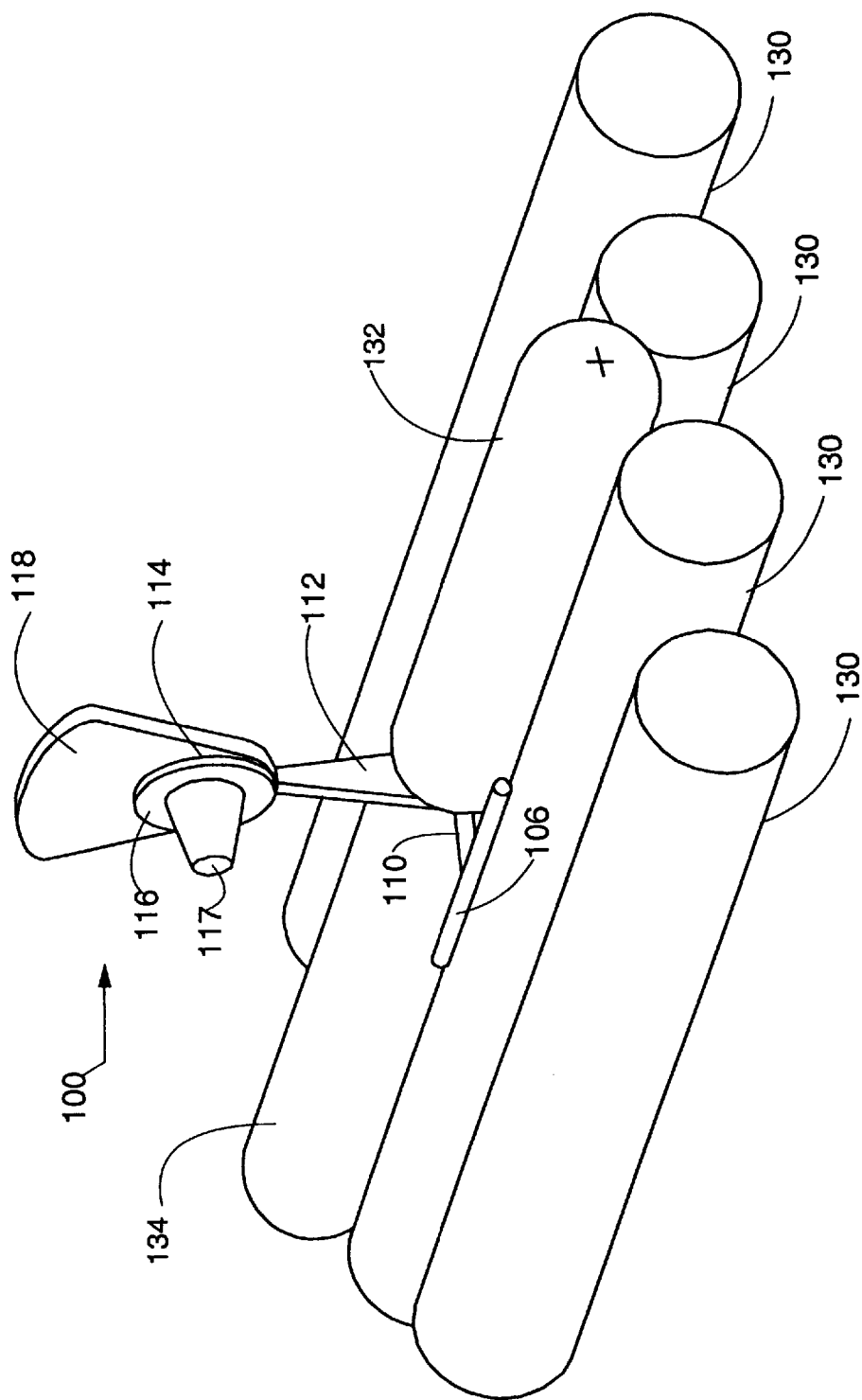
FIG. 8 is a perspective view of the grill monitoring device according to the embodiment of FIG. 1, illustrating that the H bar supports do not take up space on the grill.

The clock face area 114 is connected to the base 102 by a vertical stem 112. Although the shape and length of the stem 112 is not particularly limited, FIG. 1 shows a vertical stem 112 that is tapered from the bottom up so that the hot dogs will not readily contact the stem 112 when they are removed from or relocated on the grill. The vertical stem 112 is preferably flat so that it does not take up room on the grill. This maximizes the area on the grill that can be used for cooking. This effect is illustrated in FIG. 8 which shows that the device 100 takes up virtually no space on the grill and adjacent hot dogs 132, 134 can be placed end to end very efficiently with no wasted space.

The monitoring device 100 is inserted into the roller grill by base 102. The base 102 should be designed so that it fits between adjacent rollers 130 on the roller grill. As shown in FIG. 1, the base 102 is preferably weighted and/or widened to add stability to the device 100, particularly in light of the rolling movement of the grill rollers 130 which tends to knock over the device 100 or twist the stem 112 due to the torque created by the rollers 130. The base 102 can have any shape, but it is desirable that the shape facilitates insertion between rollers 130.

FIG. 1 illustrates an arrow shaped base 102. The pointed tip 103 allows for easy insertion between rollers 130 and between hot dogs 132, 134 on a crowded grill. The tapered base 102 creates a wedge which further facilitates insertion. The base 102, regardless of shape, is preferably made of FDA approved, heat resistant plastic.

If additional stability is desired, support bars 104, 106 can be attached to the vertical stem 102. Although a variety of suitable designs may be used for the support bars 104, 106. FIG. 1 illustrates one preferred embodiment using an "H" design. The support bars 104, 106 are attached to the vertical stem 112 by support connection bars 108, 110. When placed on the grill, the support bars 104, 106 rest on top of the rollers 130 to assist in keeping the device 100 upright and in its proper position.

Figure 7:
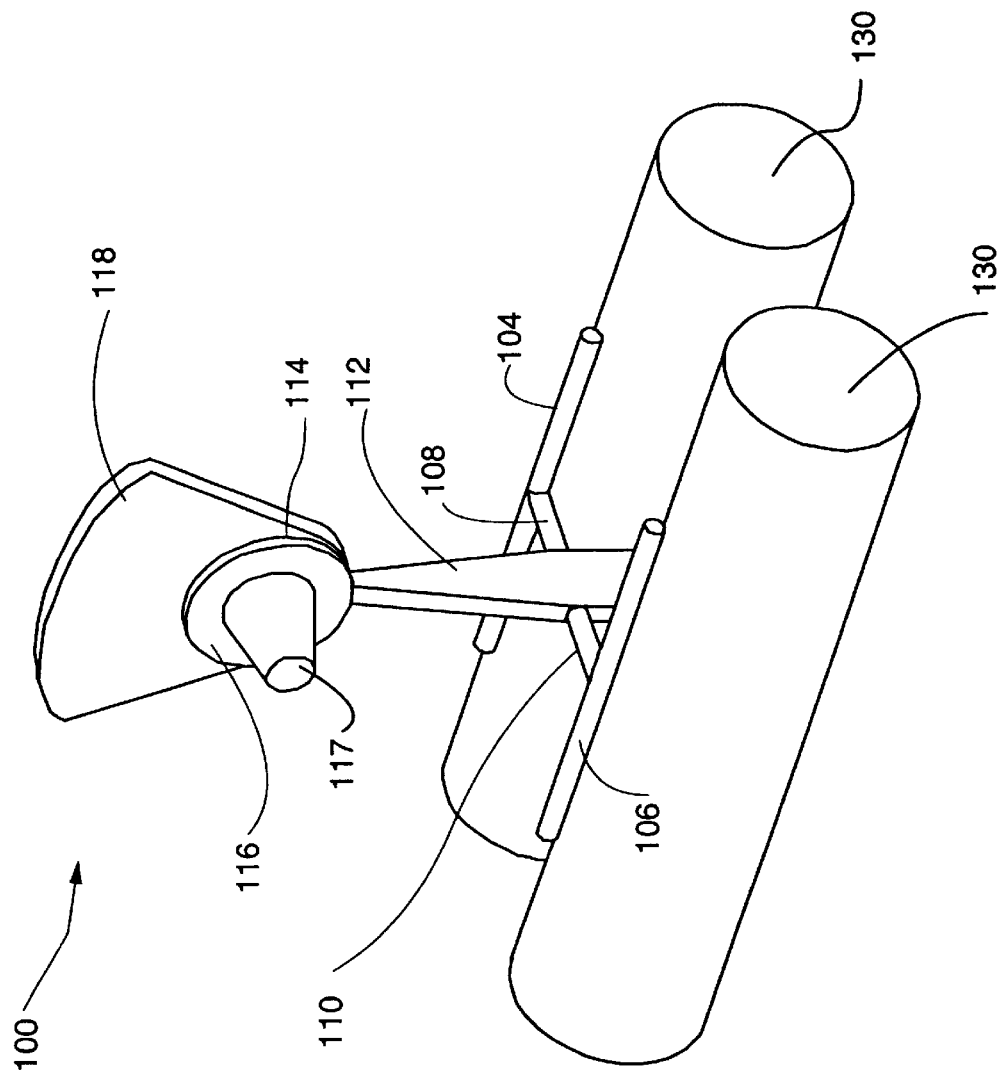
FIG. 7 is a perspective view of the grill monitoring device according to the embodiment of FIG. 1, illustrating the position of the H bar supports after being inserted between two rollers.

FIG. 6 illustrates the position of the device 100 before it is inserted between adjacent rollers 130 and FIG. 7 illustrates the position of the device after it has been inserted into the grill rollers 130. In particular, FIG. 7 shows the support bars 104, 106 resting on the rollers 130, while the clock face area 114 remains in a proper position above the grill.

As shown in FIG. 1, a signage area 118 may be present above clock face area 114. The signage area 118 can be used to identify and market the various types of hot dogs. The size and shape of the signage area 118 is not limited to the example shown in FIG. 1, although it should generally be large enough to accommodate the names of the hot dogs in letters that can be easily read by the operator or the customer.

FIG. 2 illustrates the signage area 118 and clock face area 114 in greater detail. The names of the particular flavors can be hot stamped on the signage area 118.

As shown in FIG. 3, the reverse side 120 of the signage area 118 can also be used to indicate the name of the hot dog or batch of hot dogs so that viewing angle does not matter. It is also envisioned to utilize the signage area for any number of marketing messages such as "fresh" or "delicious" and if desired the price could be indicated.

Figure 9:
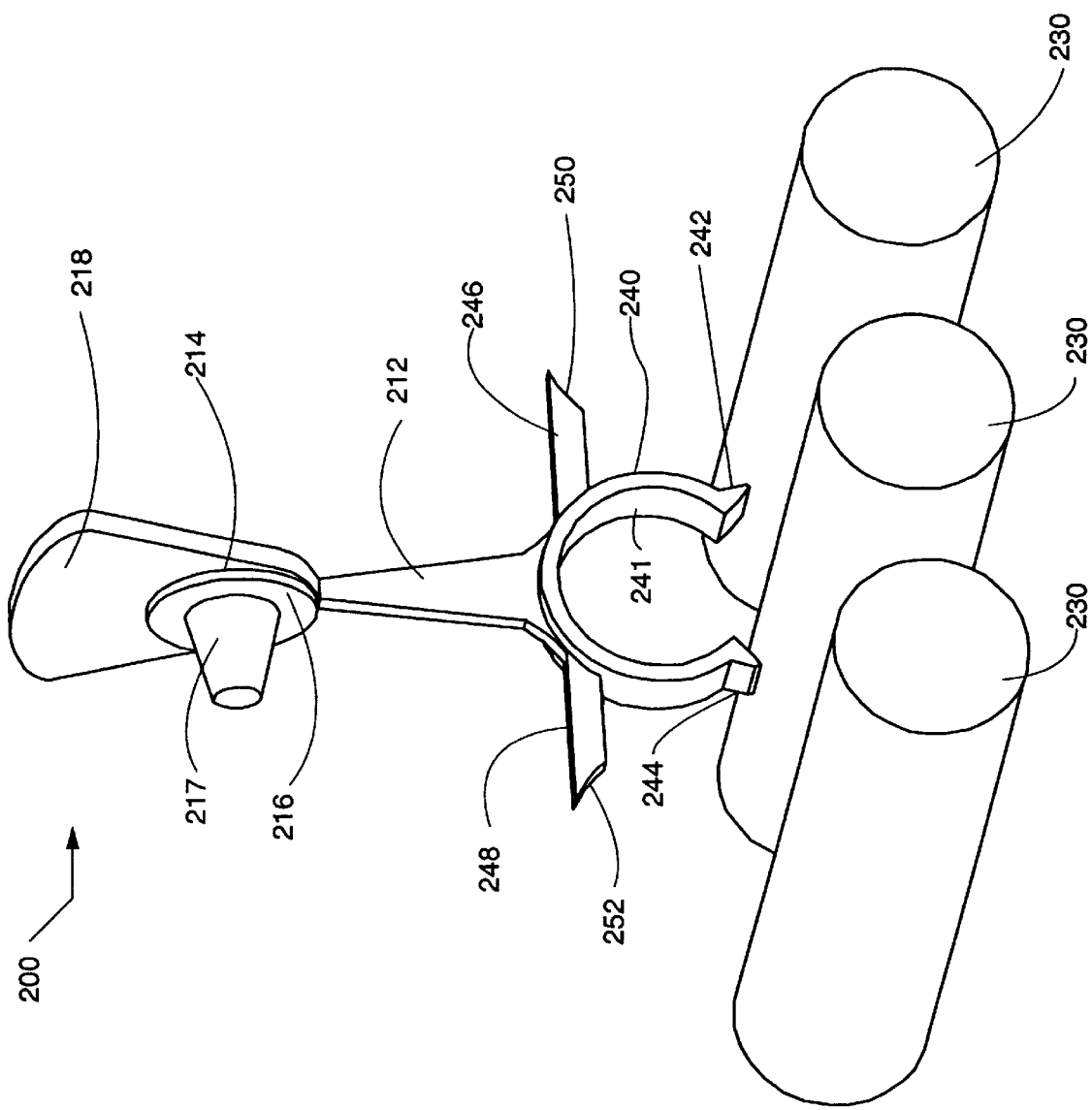
FIG. 9 is a perspective view of a grill monitoring device according to another embodiment, illustrating an arcuate, clip-on base.

FIG. 9 illustrates a different embodiment of the present invention in which a base 240 is in the shape of an arcuate clip-on member. The clip-on base 240 is designed to fit onto a grill roller 230. Since the clip-on base 240 is preferably made of FDA approved, heat resistant plastic, it is pliable enough to snap onto a grill roller 130.

Figure 10:
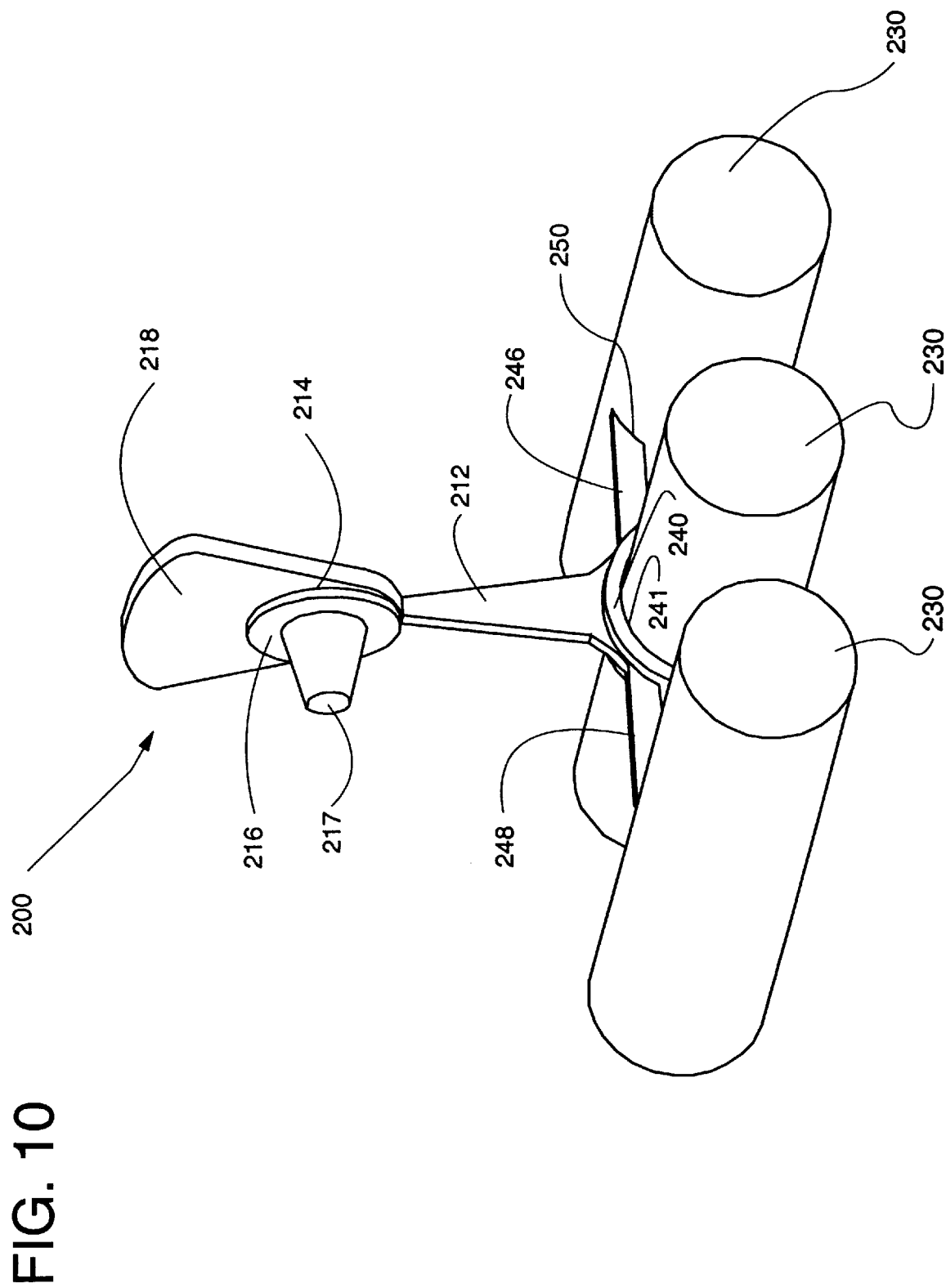
FIG. 10 is a perspective view of the grill monitoring device according to the embodiment shown in FIG. 9, illustrating the arcuate, clip-on base after being clipped onto a grill roller.

FIG. 9 further shows optional flared portions 242, 244 which add additional stability. Although not required, the support structure 246, 248 keeps the device 200 from twisting due to the rolling action of the rollers 230. When correctly snapped into place, as shown in FIG. 10, the inner circumference 241 of the base 240 slides over the grill roller 230. In this position, support structure 246, 248 keeps the device in an upright position with ends 250, 252 resting on the grill rollers 230.

Figure 11:
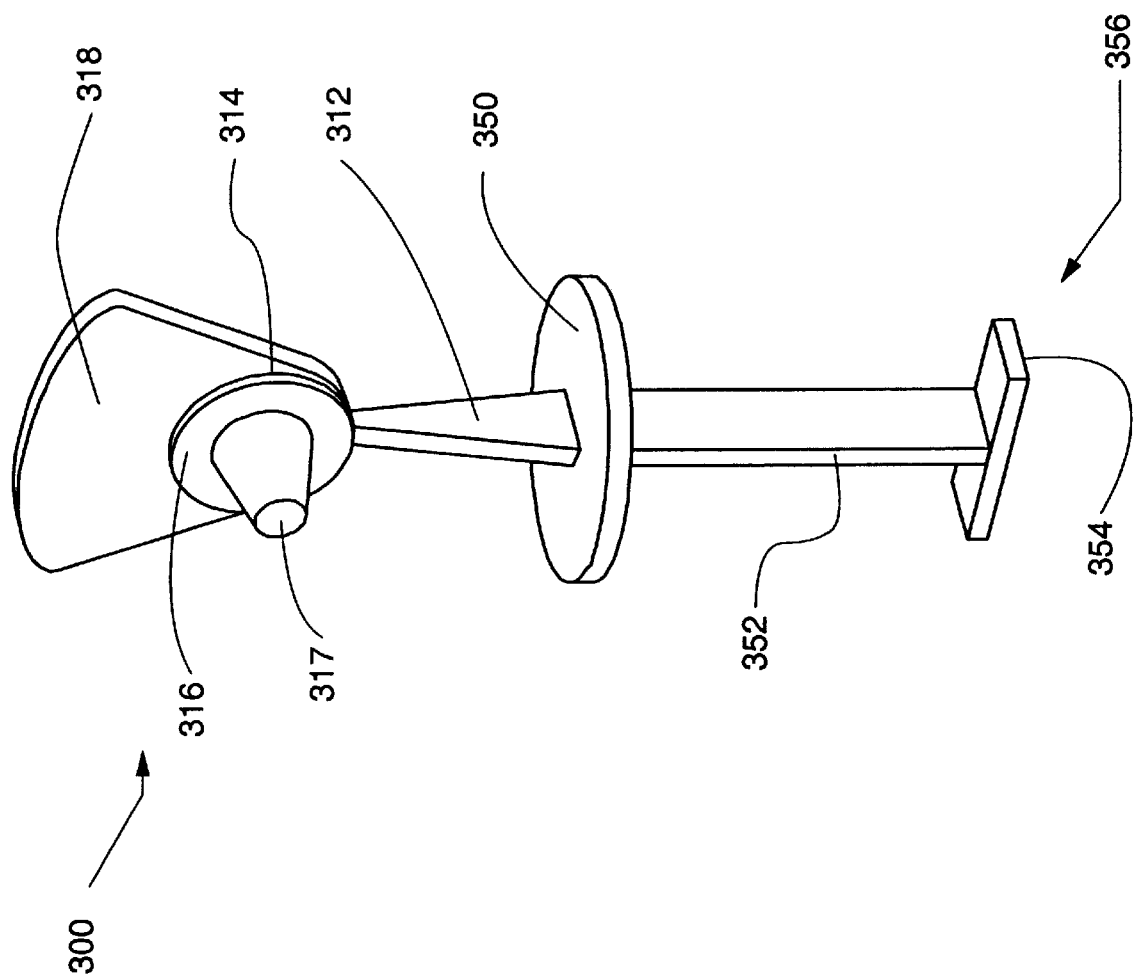
FIG. 11 is a perspective view of a grill monitoring device according to a third embodiment, illustrating a disk shaped support structure.

FIG. 11 illustrates another embodiment according to the invention in which, a base 356 is in the shape of a "T" and comprises a flat portion 354 disposed generally perpendicularly to a flat, upright portion 352. The upright base portion 352 need not be tapered since it is designed to occupy space below the rollers and therefore would not interfere with placement and movement of hot dogs on the grill.

The base 356 is designed to contact the drip pan in the bottom portion of the grill. The size and shape of the base 356 determines the degree of stability of the roller grill monitoring device 300. If added stability is desirable, a support structure 350 can be added between the upright portion 352 of the base 356 and the vertical stem 312. FIG. 11 shows a disk shaped support structure 350 which is designed to rest on top of the rollers.

Any suitable materials can be used to make the present invention, and methods of manufacturing are not particularly limited. It is preferable that the monitoring device of all the embodiments be made in two pieces: a body 121 and a dial 116. The body 121, shown in FIG. 4, is made up of the signage area, clock face area, stem, support structure and base and is formed as a single piece. The dial 116 is a second piece of the monitoring device 100. The body 121 and the dial 116 are preferably molded from heat resistant, FDA approved plastic. The advantage of these materials, as noted above, is that the plastic material is easily molded, it can be heat stamped, it is sanitary, inexpensive and dishwasher safe.

Dial 116 and clock face area 114 can be replaced with any suitable means for marking time. For example, rather than a snap on dial, movable clock hands could be attached directly to the clock face area or drawn on with an erasable marker. Indeed, the dial 116 and clock face area 114 could be replaced with an actual clock means or timer means such as an LCD clock that is removably attached between the vertical stem 112 and the signage area 118.

Although the embodiments described herein are directed to use of the present monitoring device in conjunction with a roller grill, the invention is in no way limited thereto. In fact, the present invention can be used in any application where it is useful to monitoring starting times or starting dates. Some of these other applications will be described below but the description is for exemplary purposes only, and numerous other applications can be envisioned.

In supermarkets, the present invention could be used to monitor expiration dates for frozen and refrigerated food and dry food storage. Even produce could be monitored so that the name of the vegetable, the price per pound and the expiration dates could be indicated next to the particular items.

Any one who had been in a fast food restaurant, knows that the pre-made food may have been sitting under the heating lamps for too long. The present invention could be used in this application so that the operators know how long the hamburgers, fries, etc. have been sitting under the lights.

Furthermore, the invention could be applied to any number of non-food applications. For example, the monitors could be used to monitor employees. In particular, the signage area could contain the employee's names or job titles, and the manager would note when the employee arrived at work. The dial could be calibrated to show when 8 hours time had elapsed. If the employee arrived at 9:20, the dial could be set accordingly, and then the manager would be reminded later in the day that the appropriate departure time for the employee for that day was 5:20.

In addition, the invention could be very useful in commercial kitchens in which many different pots and frying pans are on the stove at the same time. The chef could place a monitor at each pot and pan to indicate cooking starting times. In this way, the chef could more reliably keep track of elapsed cooking times for a large number of dishes.

The invention could even be used in the currently popular cigar stores. Each box of cigars in the display case could have a date and a product name associated with it so that customers and operators alike could keep track of freshness. The signs could be placed next to the boxes with free standing monitors, or the snap on or wedge shaped bases could be used to hold the monitoring devices right in with the cigars.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A food monitoring device comprising: a body including a base, a vertical stem, a clock face area, a support structure connected to said vertical stem between both ends of said vertical stem, said support structure extending from opposite sides of said vertical stem and a means for monitoring a cooking start time.

2. A food monitoring device as defined in claim 1, wherein said clock face area includes the numbers 1–12 located thereon and said means for monitoring a cooking start time includes a knob for setting the start time.

3. A roller grill monitoring device comprising:
a body including a clock face area including numbers representing a clock, a vertical stem having one end attached to said clock face area and having a length tapered along a substantial portion thereof, a base attached to said vertical stem wherein the base has a width greater than a width of said vertical stem and said base is dimensioned so that a portion of said base may be inserted in between rollers of a roller grill.

4. A roller grill monitoring device as defined in claim 3, wherein said base includes a pointed tip.

5. A roller grill monitoring device as defined in claim 3, further comprising a knob connected to said clock face area.

6. A roller grill monitoring device as defined in claim 5 wherein said clock face area includes nibs and said knob includes recesses so that said nibs cooperate with the recesses and provide a series of predetermined stop locations for said knob.

7. A roller grill monitoring device as defined in claim 3, further comprising a support structure connected to said vertical stem whereby the support structure allows the monitoring device to be positioned in a predetermined position relative to the rollers of the roller grill.

8. A roller grill monitoring device as defined in claim 7, wherein said support structure comprises support arms forming a letter "H" shape when looking down on the monitoring device.

9. A roller grill monitoring device as defined in claim 3, further comprising a signage region above said vertical stem.

10. A roller grill monitoring device as defined in claim 3, wherein said base, said vertical stem and said clock face area are integrally molded together.

11. A roller grill monitoring device as defined in claim 3, wherein said monitoring device is made of heat resistant plastic.

12. A roller grill monitoring device comprising:
a body including a clock face area including numbers representing a clock, a vertical stem attached to said clock face area, a base attached to said vertical stem and said base includes an arcuate shape and is structured and arranged to snap onto at least one roller of the roller grill.

13. A roller grill monitoring device as defined in claim 12, wherein said base includes two ends which are flared.

14. A roller grill monitoring device comprising:
a body including a clock face area including numbers representing a clock, a vertical stem attached to said clock face area, a base attached to said vertical stem, a support structure connected to said vertical stem wherein said support structure comprises a circular disk shaped support and whereby the base is dimensioned so that a portion of said base may be inserted in between rollers of a roller grill.

15. A roller grill monitoring device comprising:
a body including a clock face area including numbers representing a clock, a vertical stem attached to said clock face area, a base having a pointed tip and a width greater than a width of said vertical stem, said base being attached to said vertical stem whereby the base is dimensioned so that a portion of said base may be inserted in between rollers of a roller grill, a support structure connected to said vertical stem, said support structure comprises support arms forming a letter "H" shape when looking down on the monitoring device, a knob connected to said clock face area, wherein said knob includes recesses and said clock face area includes nibs so that said nibs cooperate with the recesses and provide a series of predetermined stop locations for said knob.

* * * * *